No. 694,798. Patented Mar. 4, 1902.
W. A. SIMISTER.
CHEESE BOX.
(Application filed Mar. 25, 1901.)
(No Model.)
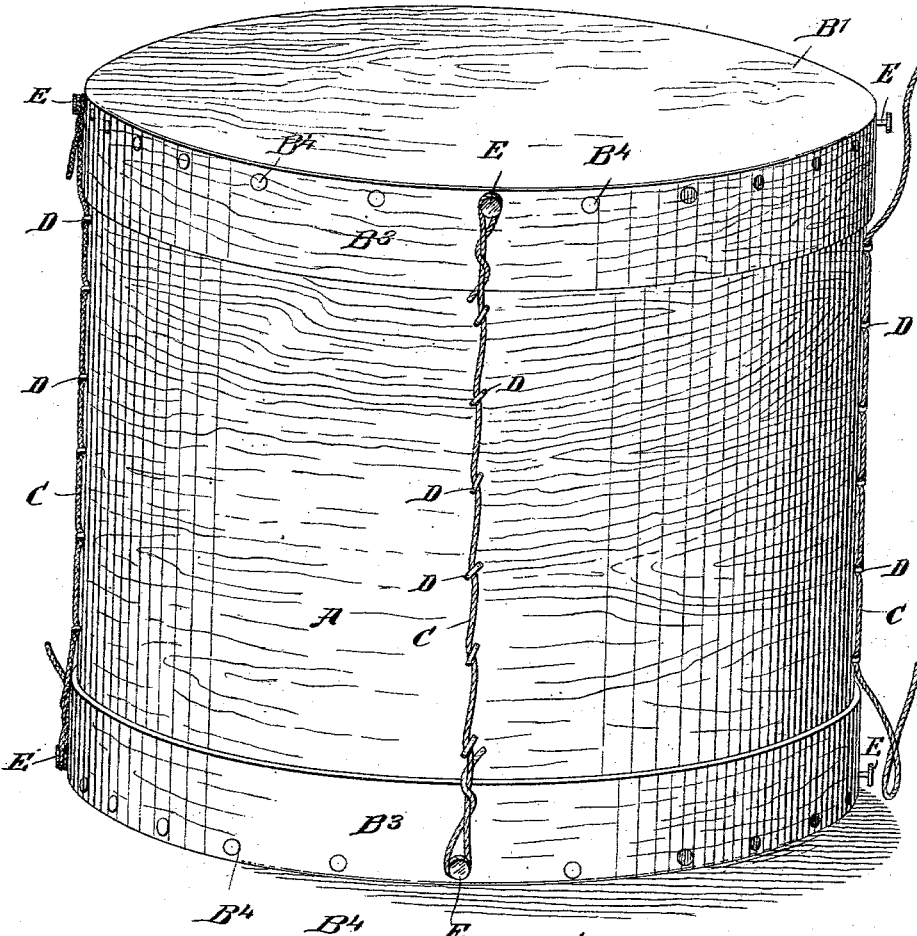
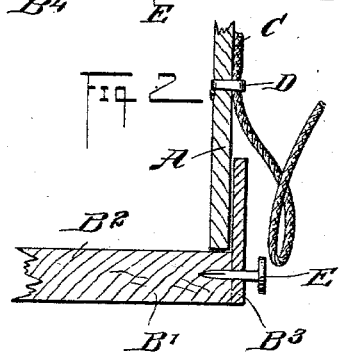
WITNESSES:
INVENTOR
William A. Simister
BY
ATTORNEYS

UNITED STATES PATENT OFFICE.

WILLIAM ANDREW SIMISTER, OF INGERSOLL, CANADA, ASSIGNOR OF ONE-HALF TO JAMES SIMISTER, OF UPPER MONTCLAIR, NEW JERSEY.

CHEESE-BOX.

SPECIFICATION forming part of Letters Patent No. 694,798, dated March 4, 1902.

Application filed March 25, 1901. Serial No. 52,767. (No model.)

*To all whom it may concern:*

Be it known that I, WILLIAM ANDREW SIMISTER, a subject of the King of Great Britain, and a resident of Ingersoll, in the Province of Ontario and Dominion of Canada, have invented a new and Improved Cheese-Box, of which the following is a full, clear, and exact description.

The object of the invention is to provide a new and improved cheese-box which is simple and durable in construction, not liable to rip or split, and arranged to removably hold both ends or heads in position on the box-body to allow of readily placing the cheese in the box by the manufacturer and to permit of locking the ends or heads in place and conveniently removing the cheese from the box by a dealer or allow of inspection of the cheese from both ends of the box without destroying the latter or injuring the cheese by the inner ends of the nails or tacks commonly employed for holding the heads of the box in place and driven through the ends or heads of the body into the cheese.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in both the views.

Figure 1 is a perspective view of the improvement, and Fig. 2 is a sectional side elevation of part of the same.

The improved cheese-box consists, essentially, of a cylindrical body A and heads B' B', removably fitted upon the ends of the box-body A, so that either or both heads may be removed and replaced whenever desired. On the box-body A are arranged a plurality of flexible ties C, preferably in the form of wires secured by staples D to the box-body A by the staples straddling the ties and driven into the box-body, to be clenched on the inside thereof, as indicated in Fig. 2. The staples D extend at an angle to one another, as is plainly indicated in Fig. 1, so that the box-body is not liable to split, but on the contrary is strengthened, and at the same time the flexible tie C is securely held in place, owing to the angular position of the staples, so that the flexible ties cannot be drawn out of the staples. The ends of the flexible ties C are extended a suitable distance to permit of winding each end around a stud or other projection E in the form of a nail partly driven into the corresponding head B' or B', as is plainly indicated in the drawings. By the arrangement described the ends of the flexible ties can be readily passed around the studs E and wound once or twice thereon and then laced back upon the remaining portion of the end, as indicated in Fig. 1 to securely hold the heads B' B' in position on the box-body A.

Each head B' B' consists of a center piece $B^2$ and a rim $B^3$, secured in position on the center piece by nails or staples $B^4$, the rim $B^3$ extending a sufficient distance to firmly engage the corresponding end of the box-body A, as is plainly indicated in Fig. 2. The projections E are also driven through the rim $B^3$ and the center piece $B^2$ to assist in holding the parts together, but in addition forming an attaching means for the ends of the flexible ties C, as previously described.

Now by the arrangement above set forth it will be seen that the heads B' B' may be independently removed at any time to allow inspection of the cheese at both ends, and the cheese is not liable to be injured in any manner by the projecting inner ends of the nails or the like heretofore driven through the rim $B^3$ into the box-body A and into the cheese to hold the heads in position on the box-body.

Having thus fully described my invention, I claim as new and desire to secure by Letters Patent—

1. A cheese-box, comprising an open-ended body, flanged heads removably fitting on the ends of the body and provided with a plurality of oppositely-arranged studs or pins projecting therefrom, and a plurality of independent non-elastic flexible ties secured upon the outer surface of the body to extend longitudinally thereof, the ends of each tie being free and wrapped around the studs or pins of the heads, as set forth.

2. A cheese-box, comprising an open-ended body, flanged heads removably fitting on the ends of the body and provided with a plurality of oppositely-arranged headed pins or studs projecting therefrom, and a plurality of independent wires secured upon the outer surface of the body to extend longitudinally thereof, the ends of each wire being free and wrapped around the studs or pins of the heads, as set forth.

In testimony whereof I have signed my name to this specification in the presence of two subscribing witnesses.

WILLIAM ANDREW SIMISTER.

Witnesses:
THEO. G. HOSTER,
EVERARD BOLTON MARSHALL.